June 7, 1938.   H. FISCHER   2,119,781

INJECTION ENGINE

Filed April 20, 1936

Inventor:
Hans Fischer
By:
Brown, Jackson, Boettcher & Dienner
Attys.

Patented June 7, 1938

2,119,781

UNITED STATES PATENT OFFICE 2,119,781

INJECTION ENGINE

Hans Fischer, Crestwood, N. Y., assignor to Lanova Corporation, New York, N. Y., a corporation of Delaware Application April 20, 1936, Serial No. 75,343

2 Claims. (Cl. 123—32)

This invention relates to injection engines, and has to do more particularly with an injection engine of the air storage chamber type.

In an injection engine the rate of burning of the fuel mixture determines the efficiency of the combustion and, therefore, the output of the engine. Theoretically, the burning of the entire fuel mixture charge while the piston is in its upper or inner dead center position would give maximum efficiency, but this is not feasible for practical reasons, due to the sudden and excessively high pressures which would be produced.

Air storage chamber injection engines in which the combustion chamber is of approximately figure 8 shape in plan, and the fuel is injected at one side of the constriction of the combustion chamber in a stream toward a funnel shaped passage at the opposite side, leading to a restricted orifice of an air storage chamber, are known in the art. In the usual type of air storage chamber engine the lobes of the combustion chamber are of cylindrical shape and uniform height. If it be assumed that the fuel mixture travels along the walls of the lobes at constant velocity, the amount of air in these lobes intermixed with fuel in equal time intervals would, in theory, be constant, and therefore the rate of combustion during the combustion period would also be constant. Practically, however, the velocity of the fuel mixture diminishes somewhat, the further it travels along the walls of the lobes, because of friction, and therefore the rate of combustion is also correspondingly diminished. I have found by experiment and practice that it is highly desirable to effect the major portion of the combustion during the early portion of the combustion period, and in order to accomplish this result it is necessary that a large proportion of the total air available in the lobes to support combustion be made available during the early part of the combustion period, rather than at a nearly uniform rate, as is customary in the usual air storage chamber type of engine. I have further found that this highly desirable result can be attained by properly placing the supporting combustion air within the combustion chamber, so that the volume available in relation to the path of travel of the fuel mixture and blast of incandescent gas ejected from the orifice of the air storage chamber will result in the major portion of the combustion occurring in a much shorter period of time than is possible in the usual type of air storage chamber engine referred to.

It is the primary object of my invention to provide an engine of the character stated which avoids the above noted objections to the referred to known type of air storage chamber injection engine. Broadly, my invention is directed to an engine of the character referred to, and a method of operation thereof, which renders possible burning the maximum amount of fuel while the piston is at or close to its inner or upper dead center position, while also maintaining the peak pressure within practical limits. A further and more specific object is so to relate the combustion chamber and the air storage chamber orifice, and associated atures, that the fuel mixture is caused to flow through a predetermined path within the combustion chamber, the latter increasing in volume, for a considerable portion of its extent, in the direction of flow of the fuel mixture. In its broader aspects, my invention is directed to causing flow of the fuel mixture, during combustion, in a predetermined path through a body of combustion supporting air which increases in amount available for combustion in the direction of travel of the mixture. Further objects and advantages of my invention will appear from the detail description.

Figure 1:
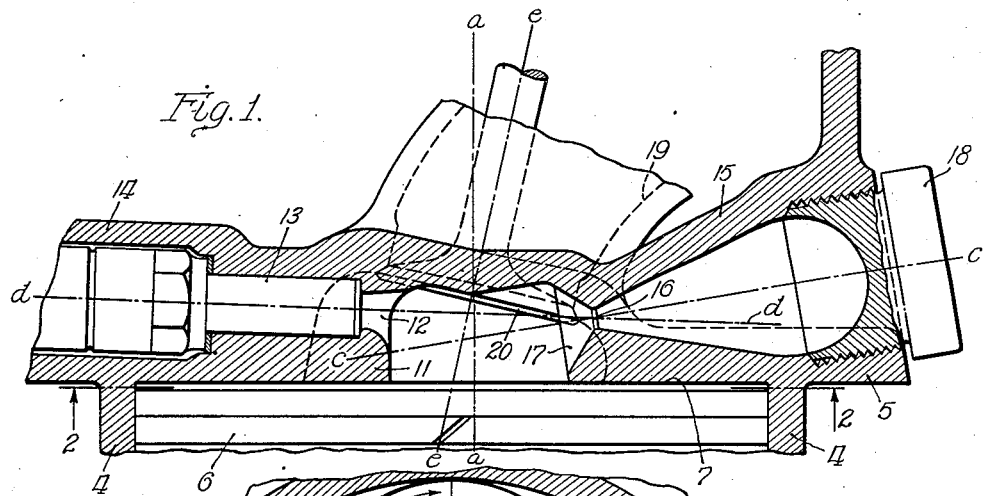
Figure 1 is a vertical axial sectional view through the upper end portion of an engine showing the portions thereof with which my invention is concerned, some parts being shown in elevation.

The engine comprises a cylinder 4 closed at its upper end by a head 5, which may be removable or may be formed integrally with the cylinder as shown, and a piston 6 operating within the cylinder. The underface 7 of head 5 is flat or planar and is disposed normal to the cylinder axis $a$—$a$. A combustion chamber 8 is formed in head 5 and overlies and opens downward into the cylinder area. This combustion chamber is of approximately figure 8 shape in plan, and comprises two circular lobes 9 and a constriction 10 therebetween defining, at one side, a point element 11 of approximately V-shape. Element 11 is provided with an opening 12 with which is aligned a fuel injection nozzle 13, of known type, mounted in a suitable manner in a sleeve 14 formed integrally with cylinder head 5. An air storage chamber 15 is formed integrally with head 5 at the opposite side of constriction 10 and opens into the latter through a restricted orifice 16, and a funnel shaped passage 17 leading from this orifice and flaring inward of the combustion chamber. Preferably orifice 16 is so disposed that the axis thereof, indicated by the line c—c, which is also the lengthwise axis of chamber 15, intersects point element 11 below the opening 12 thereof. The port of injection nozzle 13 is coaxial therewith and the axis of the nozzle, indicated by the line d—d, passes through orifice 16 centrally thereof. The injection nozzle port is thus disposed in substantial alignment with orifice 16 of the air storage chamber and is spaced therefrom considerably less than the diameter of cylinder 4, as shown, and direct impingement against the injection nozzle, adjacent the port thereof, of the hot blast ejected from the air storage chamber, to be later referred to more in detail, is avoided.

The air storage chamber 15 is shown as of elongated ovoidal shape with the orifice 16 disposed at its smaller end or point. It will be understood, however, that this chamber may be otherwise formed and of any suitable construction. Conveniently, the outer or base portion of the chamber is formed, in part, by a removable plug 18 screwed or otherwise suitably secured in head 5, the inner end of this plug being suitably recessed to define the outer portion of the interior of the chamber.

Figure 2:
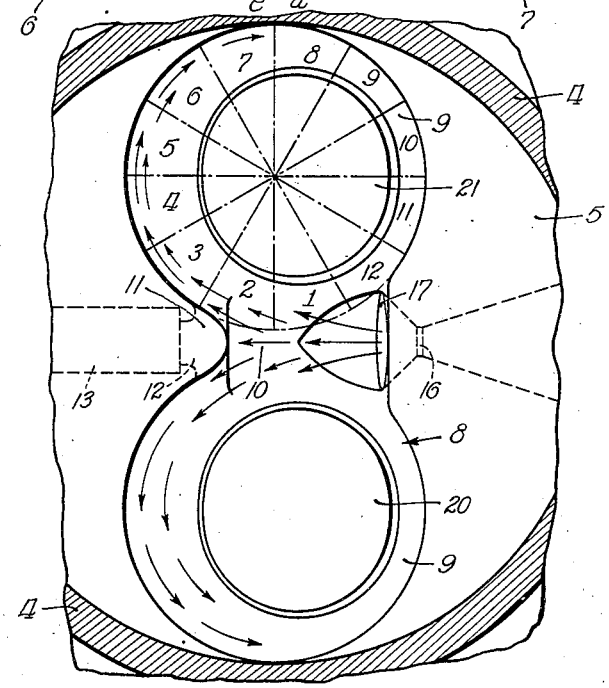
Figure 2 is a sectional view taken substantially on line 2—2 of Figure 1, parts being broken away.

Cylinder head 5 is also provided with inlet and exhaust passages opening through the roof of the combustion chamber, of which the exhaust passage 19 is shown in Figure 1. Inlet and exhaust valves 20 and 21, respectively, control these passages, the axes of these valves lying in a plane, indicated by the line e—e in Figure 1, inclined to the cylinder axis a—a. The roof of the combustion chamber is flat and is inclined from the side thereof adjacent the point element 11 downward toward the other side thereof adjacent the orifice 16 of the air storage chamber. The valves 20 and 21 project a slight distance below the roof of the combustion chamber and into lobes 9. The axes of these valves are perpendicular to the roof of the combustion chamber and the circumferential walls of lobes 9, for the major portion of the circumference thereof and in the direction of their height, are parallel to the axes of these valves. Figure 2, being a section of Figure 1 along line 2—2 parallel to the bottom of the cylinder head, rather than to the roof of the combustion chamber, shows the valve discs as elliptical in form, rather than circular, because the combustion chamber roof is not parallel to the bottom of the cylinder head.

Due to the fact that the roof of the combustion chamber is flat and inclined in the manner stated, the underface of cylinder head 5 being flat and normal to the cylinder axis, it will be seen that each of the lobes 9 increases in height, and therefore in volume, from the side thereof corresponding to orifice 16 to its other side corresponding to point element 11. This will be clear from Figure 1 and will be explained more in detail with reference to Figures 2 and 3.

Figure 3:
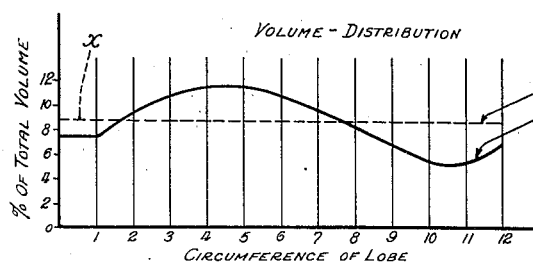
Figure 3 is a graphical illustration of a development of one of the lobes of the combustion chamber showing approximately the relative volumes of the different portions thereof.

In Figure 2 one of the lobes 9 is shown as divided into a plurality of equal sectors numbered consecutively from 1 to 12. In Figure 3 the development of this lobe is applied to a graph on which the abscissae represent the sectors of the lobe and the ordinates represent the volumes of the sectors in percent of the total volume of the lobe. Also, on this graph, the dotted line x represents approximately the volume distribution of a lobe of a combustion chamber of uniform height, such as is used in the known air storage chamber injection engine previously referred to. It will be noted from Figure 3 that the volume of sector 1 of the lobe is relatively small, increases from sector 2 to sector 4, at the latter of which it is maximum, then decreases to sector 10, from there increasing slightly to sector 12. In general, it may be said that the volume of lobe 9 increases from the side thereof adjacent orifice 16 of the air storage chamber to the other side adjacent point element 11.

During the compression stroke of the piston air is forced into the chamber 15 and is there stored under a pressure lower than that in the combustion chamber by the amount of the pressure drop through orifice 16. The major portion of the air charge is compressed within the lobes of the combustion chamber. As the piston approaches the top of its upstroke injection of fuel is initiated, injection being continued until the piston has moved a predetermined distance on its downstroke, as is known. During the continued upward movement of the piston, and prior to ignition, an appreciable amount of the injected fuel enters the air storage chamber 15 through orifice 16, due to the relation between the port of injection nozzle 13 and passage 17, flow of fuel into chamber 15 also being encouraged by flow of air into this chamber in the upward movement of the piston. The piston then continues its upward movement until the fuel in the combustion chamber is ignited by the heat of compression, which ignition in turn ignites the air storage chamber 15. The combustion of the mixture in air storage chamber 15 results in an abrupt and great increase in pressure therein, with the result that a high pressure high velocity incandescent gas blast is ejected from chamber 15 through orifice 16 in opposition to the injected fuel stream. The high velocity incandescent gas stream ejected through orifice 16 effectively disperses and atomizes the fuel stream, the resulting mixture being driven back toward the point element 11. This element serves to split the high velocity stream of fuel and incandescent gas into two portions and to divert the same into the lobes 9 of the combustion chamber, thus causing the fuel mixture to flow along the walls of these lobes in a predetermined path, as indicated by the arrows in Figure 2. While an appreciable amount of burned gas is produced in the air storage chamber 15 by the auxiliary combustion therein and is ejected from it, the main air charge, which forms the main body of combustion supporting air, is within the lobes of the combustion chamber. Accordingly, the incandescent gas blast ejected from orifice 16 into lobes 9, pushes the fuel stream from injection nozzle 13, together with the rich fuel air mixture surrounding it, in such a direction that the ensuing mixture first enters the portion of the lobes of greatest volume, where the greatest amount of air is available for combustion, and thence flows toward the areas of the lobes containing gradually decreasing volume of air available for combustion. By directing the fuel mixture in this manner, by means of the blast from the air storage chamber, I assure that a relatively large portion of the fuel will be burned during the first part of the combustion period, that is, while the piston is at or about its upper dead center position, which contributes materially to the efficiency of the engine. Since the peak pressure and the rate of pressure rise are functions of the rate of combustion, the combustion air within the respective lobes of the combustion chamber is so distributed, in the manner above described, as to assure practically complete use of all of the fuel while avoiding objectionably high pressures incident to combustion.

It is to be understood that the construction of the engine illustrated is by way of example only, and that various changes may be made therein without departing from the teaching of my invention. The disposition of the valves may be varied and the inclination of the roof of the combustion chamber may also be varied, within limits, to suit conditions and depending upon the particular engine or conditions of use thereof. While the point element 11 is preferred for splitting the high velocity fluid stream ejected through orifice 16 of chamber 15, this element may not be necessary in all instances since the fluid stream will have a tendency to expand or spread laterally and flow into the lobes of the combustion chamber and along the walls thereof, though the provision of element 11 is advantageous as more definitely dividing and guiding the fluid stream.

In Figure 3 the ordinates indicate the approximate volume of the respective sectors of the lobe, in percentage of the total volume of the latter, of the engine illustrated, by way of example, in Figures 1 and 2, as will be clear. It will be understood, however, that in practice the relative volumes of the lobe sectors may vary considerably depending upon the piston speed, cylinder diameter and other factors of the particular engine under consideration. My invention comprehends such variations and, as stated, in its broader aspects, is directed to the provision of a primary combustion space or chamber so shaped and disposed that the injected fuel stream and the surrounding rich fuel-air mixture is forced, by the high velocity fluid stream ejected from the air storage chamber, into a body of air of suitable volume such that the major portion of the fuel charge is burned while the piston is at approximately its inner dead center position, with the air body under approximately maximum compression.

A further important feature of my invention is the method of operation of the engine whereby the fuel mixture, during combustion, is caused to flow in a predetermined path through the combustion chamber such that the air available for supporting combustion, during the earlier portion of the combustion period, increases in the direction of flow of the fuel, with the attendant advantages above noted.

What I claim is:

1. In an injection engine, a cylinder and a piston operating therein, a main combustion chamber overlying and opening into the cylinder area, said chamber comprising in plan a constriction and substantially circular lobes at opposite sides thereof, an air storage chamber opening into said combustion chamber at one side of said constriction through a restricted orifice, and an injection nozzle having its port at the opposite side of said constriction in substantial alignment with said orifice for injecting fuel toward the latter, said constriction defining at said opposite side thereof a point element effective for splitting a fluid stream ejected through said orifice toward said element and for diverting the portions of the split stream into said lobes, the latter increasing in height and volume from the side thereof adjacent said orifice toward the side thereof adjacent said element.

2. In an injection engine, a cylinder and a piston operating therein, a main combustion chamber overlying and opening into the cylinder area, said chamber comprising in plan a constriction and lobes at opposite sides thereof, an air storage chamber opening into said combustion chamber at one side of said constriction through a restricted orifice, and an injection nozzle having its port at the opposite side of said constriction in substantial alignment with said orifice for injecting fuel toward the latter, said lobes being of materially greater height and volume at the side thereof adjacent said nozzle than at the side thereof adjacent said orifice.

HANS FISCHER.